United States Patent
Kim et al.

(10) Patent No.: US 10,627,967 B2
(45) Date of Patent: Apr. 21, 2020

(54) INPUT SENSING UNIT AND DISPLAY DEVICE INCLUDING THE SAME

(71) Applicant: Samsung Display Co., Ltd., Yongin-si (KR)

(72) Inventors: Kyung Seop Kim, Yongin-si (KR); Sang Youn Han, Yongin-si (KR); In Seo Kee, Yongin-si (KR); Jin Bo Shim, Yongin-si (KR); Gyeong Nam Bang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/893,689

(22) Filed: Feb. 11, 2018

(65) Prior Publication Data

US 2019/0042020 A1 Feb. 7, 2019

(30) Foreign Application Priority Data

Aug. 7, 2017 (KR) .......................... 10-2017-0099819

(51) Int. Cl.
 *G06F 3/044* (2006.01)
 *G06F 3/041* (2006.01)

(52) U.S. Cl.
 CPC ............ *G06F 3/044* (2013.01); *G06F 3/0412* (2013.01); *G06F 2203/04102* (2013.01); *G06F 2203/04111* (2013.01); *G06F 2203/04112* (2013.01)

(58) Field of Classification Search
 CPC .............. G06F 3/0412; G06F 3/044; G06F 2203/04102; G06F 2203/04111; G06F 2203/04112
 See application file for complete search history.

(56) References Cited

U.S. PATENT DOCUMENTS

| | | | |
|---|---|---|---|
| 9,201,259 B2 | 12/2015 | Kim et al. | |
| 9,383,849 B2 | 7/2016 | Hur | |
| 9,392,718 B2 | 7/2016 | Cho et al. | |
| 9,459,748 B2 | 10/2016 | Hashimoto et al. | |
| 9,557,866 B2* | 1/2017 | Liu | G06F 3/044 |
| 9,753,597 B2* | 9/2017 | Peng | G06F 3/044 |
| 2005/0030048 A1* | 2/2005 | Bolender | G06F 3/0202 |
| | | | 324/661 |
| 2007/0298231 A1 | 12/2007 | Ito et al. | |

(Continued)

FOREIGN PATENT DOCUMENTS

| | | |
|---|---|---|
| JP | 2012-181781 | 9/2012 |
| JP | 5827749 | 12/2015 |

(Continued)

OTHER PUBLICATIONS

Office Action dated Dec. 13, 2018, issued in U.S. Appl. No. 15/451,609.

(Continued)

*Primary Examiner* — Mihir K Rayan
(74) *Attorney, Agent, or Firm* — H.C. Park & Associates, PLC

(57) ABSTRACT

An input sensing unit including a plurality of capacitive sensing electrodes, and a conductive layer disposed on at least a portion of the sensing electrodes, in which the conductive layer overlaps at least a portion of the sensing electrodes in a plan view, and the conductive layer includes a plurality of conductive patterns spaced apart from each other.

19 Claims, 13 Drawing Sheets

(56) References Cited

U.S. PATENT DOCUMENTS

| | | | |
|---|---|---|---|
| 2009/0009486 A1* | 1/2009 | Sato | G02F 1/13338 345/174 |
| 2009/0213090 A1* | 8/2009 | Mamba | G06F 3/044 345/174 |
| 2011/0187676 A1* | 8/2011 | Chang | G06F 3/044 345/174 |
| 2011/0298729 A1 | 12/2011 | Kim et al. | |
| 2012/0113063 A1 | 5/2012 | Kim et al. | |
| 2012/0162099 A1* | 6/2012 | Yoo | G06F 3/0412 345/173 |
| 2012/0235953 A1 | 9/2012 | Kim et al. | |
| 2012/0306791 A1 | 12/2012 | Lee et al. | |
| 2012/0313873 A1 | 12/2012 | Bright et al. | |
| 2013/0194198 A1* | 8/2013 | Guard | G06F 3/044 345/173 |
| 2013/0207922 A1* | 8/2013 | Gillmore | G06F 3/044 345/174 |
| 2014/0076612 A1 | 3/2014 | Kuriki | |
| 2014/0139481 A1 | 5/2014 | Han et al. | |
| 2014/0152619 A1 | 6/2014 | Hotelling et al. | |
| 2014/0210767 A1 | 7/2014 | Hur | |
| 2015/0070298 A1 | 3/2015 | Shih et al. | |
| 2015/0077650 A1* | 3/2015 | Huang | G06F 3/044 349/12 |
| 2015/0084907 A1 | 3/2015 | Burberry et al. | |
| 2015/0124179 A1 | 5/2015 | Ko et al. | |
| 2015/0130760 A1 | 5/2015 | Kim | |
| 2015/0153779 A1 | 6/2015 | Ko et al. | |
| 2015/0287381 A1* | 10/2015 | Kim | G06F 3/044 345/174 |
| 2015/0370375 A1 | 12/2015 | Hayashi et al. | |
| 2016/0170524 A1* | 6/2016 | Kim | G06F 3/044 345/174 |
| 2016/0221315 A1 | 8/2016 | Saiki | |
| 2016/0378224 A1 | 12/2016 | Kwon et al. | |
| 2017/0147116 A1 | 5/2017 | Lee et al. | |
| 2017/0315657 A1 | 11/2017 | Lai et al. | |
| 2018/0067597 A1 | 3/2018 | Kim et al. | |

FOREIGN PATENT DOCUMENTS

| | | |
|---|---|---|
| KR | 10-1335425 | 12/2013 |
| KR | 10-2014-0077604 | 6/2014 |
| KR | 10-2014-0096507 | 8/2014 |
| KR | 10-2015-0051490 | 5/2015 |
| KR | 10-2016-0002565 | 1/2016 |
| KR | 10-2016-0146226 | 12/2016 |
| KR | 10-2017-0026026 | 3/2017 |

OTHER PUBLICATIONS

Notice of Allowance dated Jul. 11, 2019, issued in U.S. Appl. No. 15/451,609.

Final Office Action dated Apr. 22, 2019, issued in the U.S. Appl. No. 15/451,609.

* cited by examiner

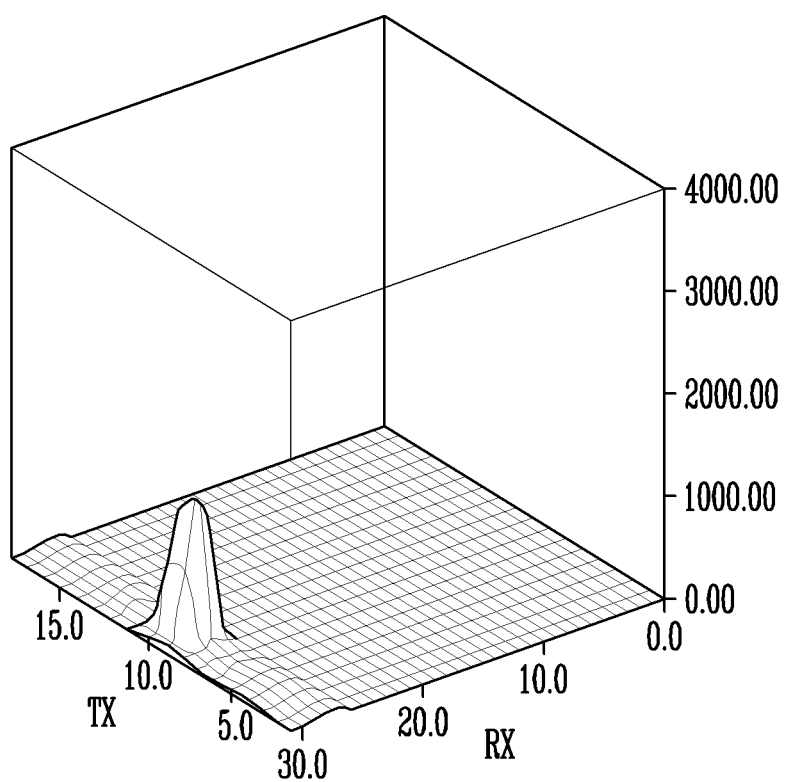

INPUT SENSING UNIT AND DISPLAY DEVICE INCLUDING THE SAME

CROSS-REFERENCE TO RELATED APPLICATION

This application claims priority from and the benefit of Korean Patent Application No. 10-2017-0099819, filed on Aug. 7, 2017, which is hereby incorporated by reference for all purposes as if fully set forth herein.

BACKGROUND

Field

Exemplary embodiments relate to an input sensing unit and a display device including the same.

Discussion of the Background

Recent display device has been developed to have information input function in addition to an image display function. The information input function of the display device may is be implemented by an input sensing unit that detects user's touch. In general, the input sensing unit includes touch electrodes and sensing lines connected to the touch electrodes, so that a touch event occurred in a sensing region may be recognized as an input signal.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an input sensing unit and a display device with improved touch sensitivity.

Additional aspects will be set forth in the detailed description which follows, and, in part, will be apparent from the disclosure, or may be learned by practice of the inventive concept.

According to an exemplary embodiment of the present invention, an input sensing unit includes a plurality of capacitive sensing electrodes, and a conductive layer disposed on at least a portion of the sensing electrodes, in which the conductive layer overlaps at least a portion of the sensing electrodes in a plan view, and the conductive layer includes a plurality of conductive patterns spaced apart from each other.

The conductive patterns disposed on different sensing electrodes may be spaced apart from each other.

A distance between the conductive patterns may be greater than a distance between the sensing electrodes.

The input sensing unit may further include a first region in which the sensing electrodes are disposed, and a second region in which the sensing electrodes are not disposed, in which the conductive patterns is disposed only in the first region.

The conductive patterns may have a mesh shape.

The conductive patterns may include conductive metal oxide, and the conductive metal oxide may include at least one of indium tin oxide (ITO), indium zinc oxide (IZO), antimony zinc oxide (AZO), indium tin zinc oxide (ITZO), zinc oxide (ZnO), tin oxide ($SnO_2$), and mixtures thereof.

The input sensing unit may further include an insulating member disposed between the conductive patterns and the sensing electrodes.

The sensing electrode may include a first sensing electrode and a second sensing electrode spaced apart from the first sensing electrode and forming a capacitance with the first sensing electrode. The first sensing electrode and the second sensing electrode may be provided in plural, respectively. The input sensing unit may further include a first connector connecting the first sensing electrodes adjacent to each other, and a second connector connecting the second sensing electrodes adjacent to each other, and the first sensing electrodes and the second sensing electrodes may be disposed on the same layer. One of the first connector and the second connector may be disposed on the same layer as the first sensing electrodes and the second sensing electrodes.

The conductive pattern disposed on the first sensing electrode and the conductive pattern disposed on the second sensing electrode may be spaced apart from each other.

The sensing electrode may include a first sensing electrode column including a plurality of first sensing electrodes arranged in a first direction, and a second sensing electrode column including a plurality of second sensing electrodes arranged in the first direction and extending in the first direction, in which the first sensing electrode column and the second sensing electrode column may be disposed adjacent to each other in a second direction crossing the first direction. A first one of the first sensing electrodes may correspond to the second sensing electrodes, the second sensing electrodes corresponding to the first one of the first sensing electrodes, respectively, may be electrically connected to the second sensing electrodes corresponding to a second one of the first sensing electrodes adjacent to the first one of the first sensing electrodes, and the conductive pattern disposed on the first sensing electrode and the conductive pattern disposed on the second sensing electrode may be spaced apart from each other.

The sensing electrode may include a plurality of conductive fine lines forming a mesh shape, and the conductive pattern may be disposed in a mesh hole formed by the conductive fine lines intersecting each other.

The conductive pattern may have a mesh shape.

The sensing electrode may include a plurality of conductive fine lines forming a mesh shape, the conductive patterns may be disposed on one sensing electrode, and the conductive patterns may be spaced apart from each other with the conductive fine line interposed therebetween in a plan view.

The sensing electrodes and the conductive layer may include a conductive polymer, and an insulating layer including an insulating polymer may be disposed between the sensing electrodes and the conductive layer.

According to an exemplary embodiment of the present invention, a display device includes a substrate, a display unit disposed on the substrate, and an input sensing unit disposed on the display unit. The input sensing unit includes a plurality of capacitive sensing electrodes, and a conductive layer disposed on at least a portion of the sensing electrodes. The conductive layer is disposed to overlap at least a portion of the sensing electrodes in a plan view, the conductive layer includes a plurality of conductive patterns spaced apart from each other, and the conductive patterns disposed on different sensing electrodes are spaced apart from each other.

The display unit may include a plurality of pixel units, the sensing electrode may include a plurality of conductive fine lines forming a mesh shape, and each of the pixel units may be disposed in a mesh hole formed by the conductive fine lines intersecting each other.

A plurality of conductive patterns may be disposed to be spaced apart from each other, and the conductive patterns and the pixel units may correspond to each other, respectively.

Each of the pixel units may include a first electrode, a second electrode disposed on the first electrode, and an emission layer disposed between the first electrode and the second electrode, in which at least one encapsulation layer is disposed between the second electrode and the sensing electrode.

The input sensing unit may be disposed directly on the encapsulation layer, and at least one insulating layer may be disposed between the sensing electrode and the encapsulation layer.

The encapsulation layer may include a multi-layer, and at least one layer of the multi-layered encapsulation layer may include an inorganic material.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 10C is a graph showing touch sensitivity of a display device according to an exemplary embodiment of the present invention.

DETAILED DESCRIPTION OF THE ILLUSTRATED EMBODIMENTS

Figure 1:
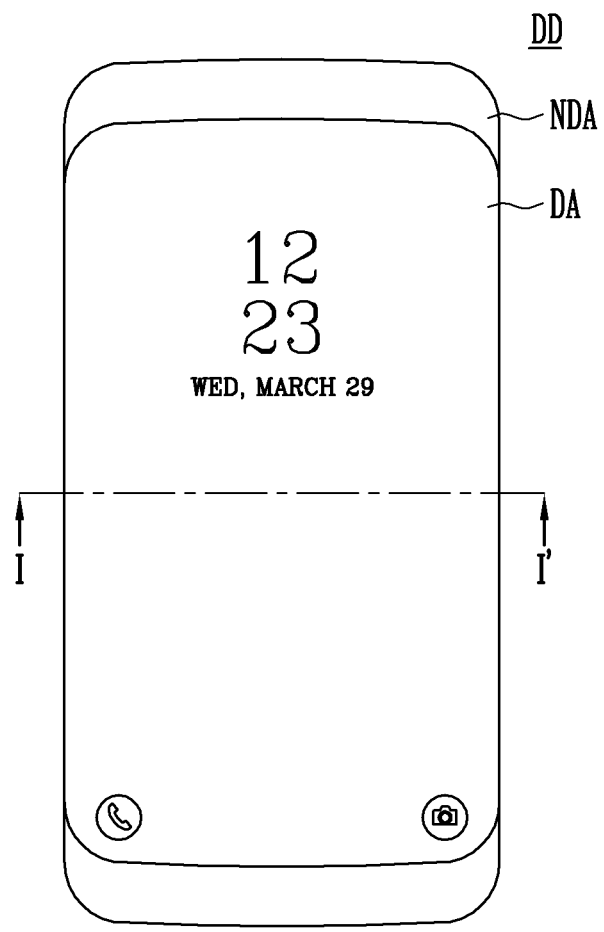
FIG. 1 is a plan view for illustrating a display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
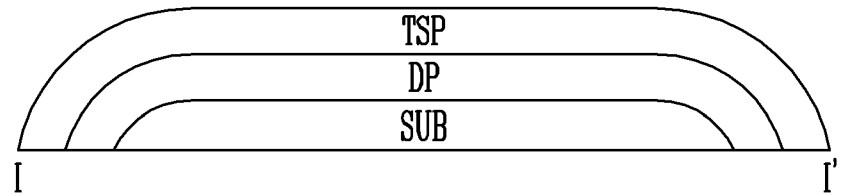
FIG. 2 is a cross-sectional view taken along line I-I' of FIG. 1

FIG. 1 is a plan view for illustrating a display device according to an exemplary embodiment of the present invention, and FIG. 2 is a cross-sectional view taken along line I-I' of FIG. 1.

Referring to FIGS. 1 and 2, the display device DD according to an exemplary embodiment may include a display region DA and a non-display region NDA. The display area DA may include a plurality of pixels, and an image may be output in the display area DA. The display region DA may have a shape corresponding to a shape of a display unit DP. For example, the display region DA may have various shapes, such as a closed polygon having a side of a straight line, a circle and an ellipse having a side of a curved line, and a semicircle and a semi-ellipse having a side of a straight line and a curved line, and the like, similar to the shape of the display unit DP. In an exemplary embodiment of the present invention, the display region DA may have a rectangular shape having rounded corners.

The non-display region NDA may be disposed at one side of the display region DA. Referring to FIG. 1, the non-display region NDA is disposed only on upper and lower sides of the display region DA, but a disposition of the display region DA and the non-display region NDA is not limited thereto. Therefore, the disposition of the display region DA and the non-display region NDA may be varied as needed.

The display device DD may have a form, in which a substrate SUB, a display unit DP, and an input sensing unit TSP are sequentially stacked.

As shown in FIG. 2, a cross-section the display device DD may include curved surfaces at opposing side edges. However, the shape of the display device DD is not limited thereto, and the display device DD may have a shape that does not include a curved surface at opposing side edges, or a shape that includes a curved surface only at one side edge. The amount of curvature of the curved surface may also be varied. When a cross-section of the display device DD includes the curved surfaces at opposing side edges, the display unit DP and the input sensing unit TSP may extend to a curved edge. Accordingly, the curved edge may output an image, and also recognize a user's touch.

The shape and material of the substrate SUB are not particularly limited. The substrate SUB may be a rigid substrate or a flexible substrate. The rigid substrate may include a glass substrate, a quartz substrate, a glass ceramic substrate, and a crystalline glass substrate. The flexible substrate may include a film substrate and a plastic substrate including a polymeric organic material. For example, the flexible substrate may include at least one selected from the group consisting of polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP). In addition, the flexible substrate may include fiberglass reinforced plastic (FRP).

The substrate SUB may have a shape corresponding to the display device DD. For example, the substrate SUB may have various shapes, such as a closed polygon having a side of a straight line, a circle and an ellipse having a side of a curved line, and a semicircle and a semi-ellipse having a side of a straight line and a curved line, and the like.

The display unit DP is provided on the substrate SUB. The display unit DP may include a plurality of pixels as described above, and may further include a driver for driving the pixels.

The input sensing unit TSP is provided on the display unit DP. The input sensing unit TSP may be disposed on the display unit DP in a panel form, or may be provided on the display unit DP in a layer form. When the input sensing unit TSP is manufactured in the panel form, the input sensing unit TSP may be manufactured through a separate process from a manufacturing process of the display device DD, and then attached on the display unit DP. At this time, an adhesive or the like may be used to attach the display unit DP and the input sensing unit TSP. When the input sensing unit TSP is in the panel form, the input sensing unit TSP may include a base substrate, on which a sensing electrode and the like are provided. The base substrate may be optically transparent and transmit light emitted from the display unit DP.

When the input sensing unit TSP is provided on the display unit DP in a layer form, the input sensing unit TSP may not include a base substrate. Thus, the input sensing unit TSP may be directly disposed on the display unit DP. As used herein, "directly disposed" may refer to the input sensing unit TSP not being manufactured in a separate process and attached on the display unit DP, but being directly formed on the display unit DP successively following the manufacturing process of the display unit DP.

Since the input sensing unit TSP in the layer form does not include the base substrate, a total thickness of the display device DD may be reduced by a thickness occupied by the base substrate. Accordingly, a thickness of the display device DD may be relatively small. When the input sensing unit TSP is in the layer form, an encapsulation layer (not shown) of the display unit DP may function like the base substrate, instead of omitting the base substrate. For example, the sensing electrode and the like included in the input sensing unit TSP may be formed on the encapsulation layer of the display unit DP. In order to form the input sensing unit TSP on the encapsulation layer, the encapsulation layer may include a relatively hard inorganic layer. Thus, when the encapsulation layer has a multilayer structure, at least one layer of the multilayered encapsulation layer may include an inorganic material.

When the encapsulation layer has a multilayer structure, the encapsulation layer may include three sequentially stacked layers according to an exemplary embodiment. In this case, each layer may include an organic material and/or an inorganic material. However, the outermost layer may include an inorganic material as described above.

According to an exemplary embodiment, the organic material may include an organic insulating material, such as a polyacryl-based compound, a polyimide-based compound, a fluorocarbon compound, such as Teflon, a benzocyclobutene compound, and the like. In addition, the inorganic material may include polysiloxane, silicon nitride, silicon oxide, silicon oxynitride, and the like.

In addition to functioning as a base substrate of the display unit DP to which an input sensing unit TSP may be disposed, the encapsulation layer may also prevent moisture or oxygen from penetrating into the display unit DP.

The encapsulation layer may cover the display region DA and extend to the outside of the display region DA. In addition, only a layer including inorganic material may be provided at the end of the encapsulation layer, because water or oxygen may penetrate through an organic material when a layer includes the organic material.

Figure 3:
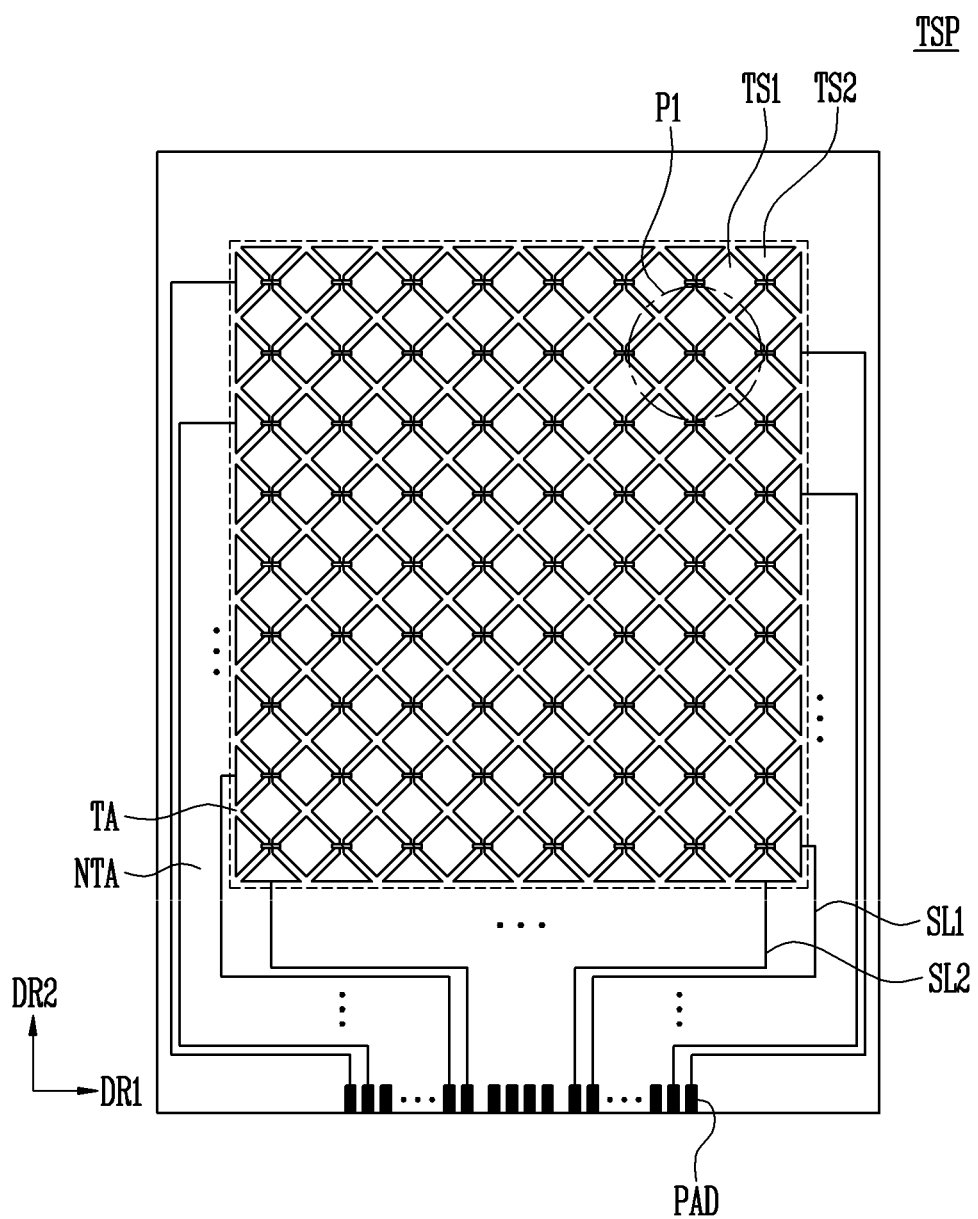
FIG. 3 is a plan view for illustrating an input sensing unit according to an exemplary embodiment of the present invention.
Figure 4A:
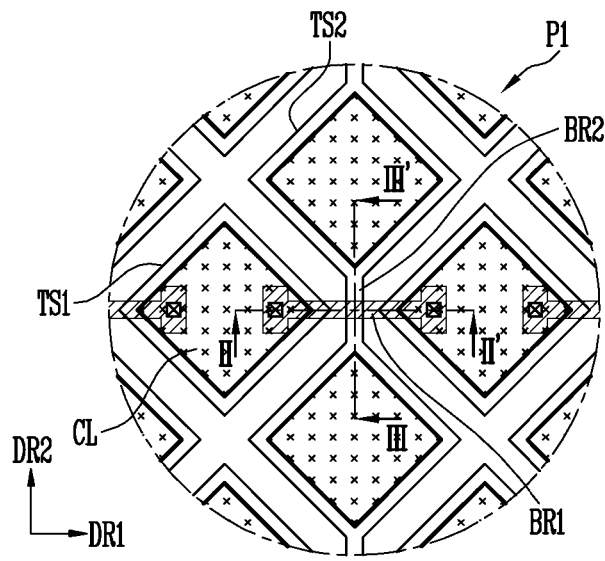
FIG. 4A is an enlarged plan view of region P1 in FIG. 3.
Figure 4B:
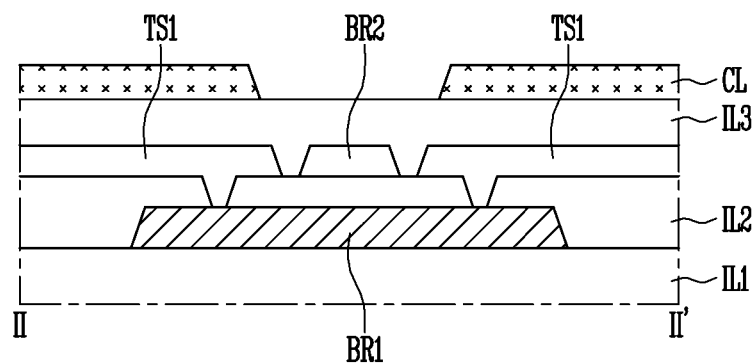
FIG. 4B is a cross-sectional view taken along line II-II' of FIG. 4A.
Figure 4C:
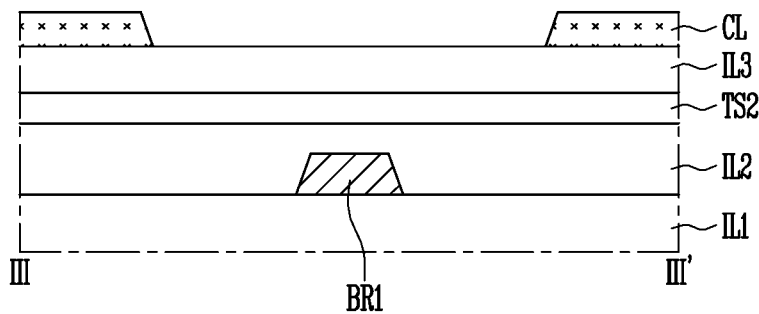
FIG. 4C is a cross-sectional view taken along line of FIG. 4A.

FIG. 3 is a plan view for illustrating an input sensing unit according to an exemplary embodiment of the present invention. FIG. 4A is an enlarged plan view of region P1 in FIG. 3. FIG. 4B is a cross-sectional view taken along line II-II' of FIG. 4A. FIG. 4C is a cross-sectional view taken along line of FIG. 4A.

Referring to FIG. 3, the input sensing unit TSP according to an exemplary embodiment includes a touch active region TA and a touch inactive region NTA. The touch active region TA is a region capable of sensing the user's touch. At least one sensing electrode TS1 or TS2 may be provided in the touch active region TA to sense the user's touch. Connecting lines SL1 and SL2 connecting the sensing electrodes TS1 and TS2 and the pad unit PAD may be provided in the touch inactive region NTA. In some cases, the touch active region TA of the input sensing unit TSP may correspond to the display region of the display unit, and the touch inactive region NTA may correspond to the non-display region of the display unit. As used herein, the term 'correspond' is not limited to refer that each region matches exactly. Therefore, when the touch active region TA and the display region correspond to each other, an area of the two regions may be different from each other. For example, the area of the touch active region TA may be larger than the area of the display region. In this case, the touch active region TA is extended to a non-display region, in which a pixel unit is not provided, and may be used as an operation unit for controlling the display device.

As shown in FIG. 3, the input sensing unit TSP includes a first sensing electrode TS1 and a second sensing electrode TS2. A plurality of first sensing electrodes and a plurality of second sensing electrodes are provided. The first sensing electrode TS1 and the second sensing electrode TS2 may be provided in a mutual capacitive type and/or a self capacitive type.

In an exemplary embodiment, a controller (not shown) may be provided in the input sensing unit TSP. One of the first sensing electrode TS1 and the second sensing electrode TS2 may be a driving electrode for receiving a driving signal from the controller. The other of the first sensing electrode TS1 and the second sensing electrode TS2 may be a receiving electrode for transmitting an external sensing signal, such as a user's touch, to the controller. For example, the first sensing electrode TS1 may be a driving electrode, and the second sensing electrode TS2 may be a receiving electrode. Alternatively, the first sensing electrode TS1 may be a receiving electrode, and the second sensing electrode TS2 may be a driving electrode. The controller recognizes the touch by recognizing the sensing signal received from the receiving electrode.

The first sensing electrode TS1 and the second sensing electrode TS2 are connected to the pad unit PAD through a first connecting line SL1 and a second connecting line SL2, respectively. At least one of the first connecting line SL1 and the second connecting line SL2 may be connected to both ends of a series of sensing electrode TS1 or TS2 connected to each other. For example, referring to FIG. 3, both ends of the first sensing electrode TS1 are connected to the first connecting line SL1. However, the configuration of the connection between the connecting line and the sensing electrode is not limited to the above. For example, only one end of the first sensing electrode TS1 of the input sensing unit TSP may be connected to the first connecting line SL1, and both ends of the second sensing electrode TS2 of the input sensing unit TSP may be connected to the second connecting line SL2.

The pad unit PAD may be connected to the ends of the first connecting line SL1 and the second connecting line SL2. Herein, the ends of the first connecting line SL1 and the second connecting line SL2 are connected to the pad unit PAD, but inventive concepts are not limited thereto. For example, the first connecting line SL1 and the second connecting line SL2 may be connected to each other in the touch inactive region NTA.

A plurality of first sensing electrodes TS1 and a plurality of second sensing electrodes TS2 of the input sensing unit TSP may be electrically connected to adjacent electrodes, respectively. For example, in a plurality of first sensing electrodes TS1, the first sensing electrodes adjacent to each other in the first direction DR1 may be connected to each other. In addition, in a plurality of second sensing electrodes TS2, the second sensing electrodes adjacent to each other in the second direction DR2 may be connected to each other. In this case, the first connecting line SL1 may be connected to the first sensing electrode TS1 disposed at the end of the first direction DR1, and the second connecting line SL2 may be connected to the second sensing electrode TS2 disposed at the end of the second direction DR2.

The configuration of the connection of the first sensing electrode TS1 and the second sensing electrode TS2 is shown in more detail in FIGS. 4A to 4C.

Referring FIG. 4A, the first sensing electrode TS1 and the second sensing electrode TS2 are spaced apart from each other. An electrostatic capacitance may be formed between the first sensing electrode TS1 and the second sensing electrode TS2. When a touch from the user occurs, the electrostatic capacitance formed between the first sensing electrode TS1 and the second sensing electrode TS2 changes, and the controller recognizes the electrostatic capacitance to sense a touch position.

The first sensing electrodes TS1 adjacent to each other in the first direction DR1 are connected by a first connector BR1. In addition, the second sensing electrodes TS2 adjacent to each other in the second direction DR2 are connected by a second connector BR2. According to an exemplary embodiment, the first sensing electrode TS1 and the second sensing electrode TS2 are provided at the same layer, and one of the first connector BR1 and the second connector BR2 is provided at the same layer as the first sensing electrode TS1 and the second sensing electrode TS2. In this case, the other of the first connector BR1 and the second connector BR2 is provided at a different layer from the first sensing electrode TS1 and the second sensing electrode TS2.

Referring to FIGS. 4A to 4C, the first connector BR1 is provided at a different layer from the first sensing electrode TS1 and the second sensing electrode TS2. In addition, the second connector BR2 is provided at the same layer as the first sensing electrode TS1 and the second sensing electrode TS2. The second connector BR2 may be formed integrally with the second sensing electrode TS2. Accordingly, the first sensing electrode TS1, the second sensing electrode TS2, and the second connector BR2 may be formed simultaneously in the same step of the process. However, even though the second connector BR2 is formed at the same layer as the first sensing electrode TS1 and the second sensing electrode TS2, the second connector BR2, the first sensing electrode TS1, and the second sensing electrode TS2 may be formed at different steps in the process. For example, the second connector BR2 may be formed at a different step using a different material from those of the first sensing electrode TS1 and the second sensing electrode TS2. In addition, FIGS. 4A to 4C are merely illustrative, and unlike the exemplary embodiment shown in FIGS. 4A to 4C, the first connector BR1 may be provided at the same layer as the first sensing electrode TS1 and the second sensing electrode TS2.

The first sensing electrode TS1, the second sensing electrode TS2, the first connector BR1, and the second connector BR2 may include a conductive material. In addition, the first sensing electrode TS1, the second sensing electrode TS2, the first connector BR1, and the second connector BR2 may have a single layer or multilayer structure.

The first sensing electrode TS1 and the second sensing electrode TS2 include a conductive material. The conductive material may include a conductive polymer, a conductive metal oxide, or the like. In an exemplary embodiment, the conductive polymer includes a polythiophene-based compound, a polypyrrole-based compound, a polyaniline-based compound, a polyacetylene-based compound, a polyphenylene-based compound, and a mixture thereof. More particularly, the conductive polymer may be a poly (3,4-ethylenedioxythiophene) polystyrene sulfonate (PEDOT: PSS) compound, among the polythiophene-based compound. The conductive metal oxide may include indium tin oxide (ITO), indium zinc oxide (IZO), antimony zinc oxide (AZO), indium tin zinc oxide (ITZO), zinc oxide (ZnO), tin oxide ($SnO_2$), or the like.

The first connector BR1 and the second connector BR2 may include the same materials as the first sensing electrode TS1 and/or the second sensing electrode TS2.

In exemplary embodiment shown in FIGS. 4A to 4C, the first connector BR1 may be provided under the layer provided with the first and second sensing electrodes TS1 and TS2 and the second connector BR2. However, in some cases, the first connector BR1 may be provided on the layer provided with the first and second sensing electrodes TS1 and TS2 and the second connector BR2. The first connector BR1 and the first sensing electrode TS1 are electrically connected through a contact hole.

A second insulating layer IL2 may be provided between the first connector BR1 and the second connector BR2. Accordingly, the first connector BR1 and the second connector BR2 may cross each other with the second insulating layer IL2 therebetween. FIGS. 4B to 4C shows a structure, in which the second insulating layer IL2 is formed entirely. However, according to an exemplary embodiment, the second insulating layer IL2 may have an island shape locally patterned at a crossing area of the first connector BR1 and the second connector BR2.

A first insulating layer IL1 may be provided between the first connector BR1 and the display unit. However, in some cases, the first insulating layer IL1 may be omitted, and the first connector BR1 may be formed directly on the encapsulation layer.

At least one of the first insulating layer IL1 and the second insulating layer IL2 may include an organic material. The organic material may include at least one of an acryl-based resin, a methacrylate-based resin, an polyisoprene, a vinyl-based resin, an epoxy-based resin, a urethane-based resin, a cellulose-based resin, a siloxane-based resin, a polyimide-based resin, a polyamide-based resin, a perylene-based resin, and a combination thereof.

In addition, at least one of the first insulating layer IL1 and the second insulating layer IL2 may include an inorganic material. The inorganic material may include at least one of aluminum oxide, titanium oxide, silicon oxide, silicon oxynitride, zirconium oxide, hafnium oxide, and a combination thereof.

According to an exemplary embodiment, a conductive layer is provided on the first sensing electrode TS1 and the second sensing electrode TS2. The conductive layer includes a plurality of conductive patterns CL. The conductive pattern CL is disposed to overlap at least a portion of the sensing electrodes TS1 and TS2 in a plan view. As such, the area and shape of the conductive pattern CL may not necessarily coincide with the area and shape of the sensing electrodes TS1 and TS2. Specifically, as shown in FIG. 4A, the conductive pattern CL may have a shape similar to the sensing electrodes TS1 and TS2, but may have a smaller area than that of either of the sensing electrodes TS1 and TS2. In this case, a portion of the sensing electrodes TS1 and TS2 do not overlap the conductive pattern CL.

When a region provided with the sensing electrodes TS1 and TS2 is referred to as a first region, and a region not provided with the sensing electrodes TS1 and TS2 is referred to as a second region, the conductive pattern CL may be provided only on the first region. Therefore, the conductive pattern CL may not overlap the connectors BR1 and BR2 or the connecting lines SL1 and SL2.

Unlike the exemplary embodiment shown in FIG. 4A, the sensing electrodes TS1 and TS2 and the conductive pattern CL may have a different shape. For example, the sensing electrodes TS1 and TS2 may have a rhomboid shape, and the conductive pattern CL provided on the sensing electrodes TS1 and TS2 may have a circular shape. However, the inventive concepts are not limited thereto, and thus, the sensing electrodes TS1 and TS2 and the conductive pattern CL may have various shapes.

The two or more conductive patterns CL provided on the different sensing electrodes TS1 and TS2 are spaced apart from each other. In this case, the different sensing electrodes may refer to a first sensing electrode TS1 and a second sensing electrode TS2, one first sensing electrode TS1 and another first sensing electrode TS1, or one second sensing electrodes TS2 and another second sensing electrode TS2.

The distance between the conductive patterns CL provided on the different sensing electrodes TS1 and TS2 may be greater than the distance between the sensing electrodes TS1 and TS2. For example, referring to FIG. 4A, the conductive pattern CL may have a smaller area than each of the sensing electrodes TS1 and TS2. As such, the distance between the conductive patterns CL may be greater than the distance between the first sensing electrode TS1 and the second sensing electrode TS2. In addition, referring to FIG. 4B, the distance between the conductive patterns CL provided on adjacent first sensing electrode TS1 may be greater than the distance between two adjacent first sensing electrodes TS1. Therefore, when the distance between the conductive patterns CL is greater than the distance between the sensing electrodes, "the distance between the sensing electrodes" used herein refers the distance between different kinds of sensing electrodes such, as the first sensing electrode TS1 and the second sensing electrode TS2, as well as the same kind sensing electrodes adjacent to each other. In addition, "distance" may refer to a mean distance between two elements.

The distance between the conductive patterns CL may be in a range of 3 μm to 15 μm. As will be described later, the distance between the conductive patterns CL may be 3 μm or more, in order to remove capacitance interference due to the conductive pattern CL on the sensing electrode. In order to prevent the conductive pattern CL from being visible to the user, the distance between the conductive patterns CL is preferably 15 μm or less.

As a material of the conductive pattern CL, a conductive metal oxide or the like may be used. The conductive metal oxide may include indium tin oxide (ITO), indium zinc oxide (IZO), antimony zinc oxide (AZO), indium tin zinc oxide (ITZO), zinc oxide (ZnO), and tin oxide ($SnO_2$).

However, the material forming the conductive pattern CL is not limited thereto, and other conductive material may be used as long as it may satisfy the above-mentioned physical property.

For example, the conductive pattern CL may include a conductive polymer. The conductive polymer may include at least one of a polythiophene-based compound, a polypyrrole-based compound, a polyaniline-based compound, a polyacetylene-based compound, a polyphenylene-based compound, and a mixture thereof. Particularly, the conductive polymer may be a poly (3,4-ethylenedioxythiophene) polystyrene sulfonate (PEDOT:PSS) compound among polythiophene-based compounds. The conductive polymer may be manufactured by wet coating. Alternatively, the conductive polymer may be manufactured by a roll-to-roll method. Since the conductive polymer has high flexibility, the possibility of cracking during bending may be lowered. The PEDOT:PSS compound may have relatively low resistivity and relatively high transmittance.

In an exemplary embodiment, the conductive pattern CL may have a sheet resistance of 104 ψ/sq or less. In an exemplary embodiment, the conductive pattern CL may have a thickness of 100 Å or less. Since the conductive pattern CL has a thickness of 100 Å or less, a decrease of transmittance and an increase of reflectance due to the conductive pattern CL may be prevented. Accordingly, even when the conductive pattern CL overlaps the pixel unit in a plan view, a distortion or a luminance decrease of light emitted from the pixel unit may be prevented.

In an exemplary embodiment, the conductive pattern CL may have a transparency of 80% or more, and in another exemplary embodiment, the conductive pattern CL may have a transparency of 90% or more.

A third insulating layer IL3 may be provided between the conductive pattern CL and the sensing electrodes TS1 and TS2. The sensing electrodes TS1 and TS2 and the conductive pattern CL may be insulated by the third insulating layer IL3.

The third insulating layer IL3 may include an organic material. The organic material may include at least one of an acryl-based resin, a methacrylate-based resin, an polyisoprene, a vinyl-based resin, an epoxy-based resin, a urethane-based resin, a cellulose-based resin, a siloxane-based resin, a polyimide-based resin, a polyamide-based resin, a perylene-based resin, and a combination thereof.

In another exemplary embodiment, the third insulating layer IL3 may include an inorganic material. The inorganic material may include at least one of aluminum oxide, titanium oxide, silicon oxide, silicon oxynitride, zirconium oxide, hafnium oxide, and a combination thereof.

The third insulating layer IL3 may have a thickness in a range of 0.5 μm to 1.5 which may improve the touch sensitivity of the display device or the input sensing unit.

Figure 5A:
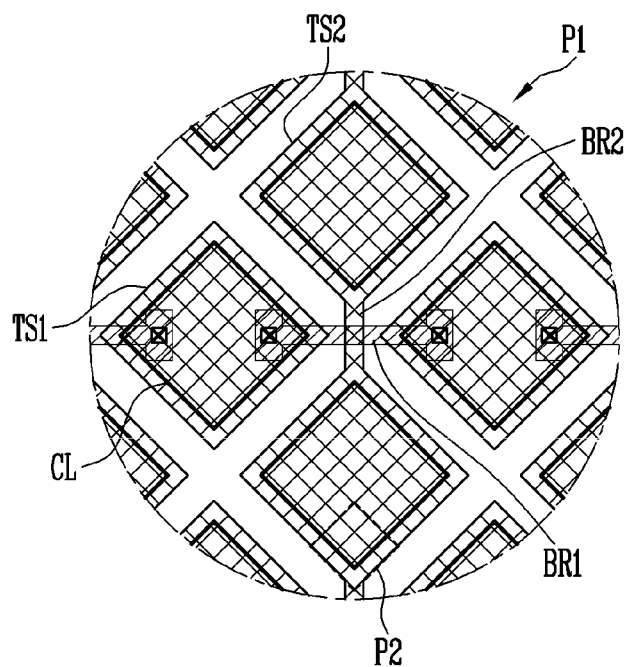
FIG. 5A is an enlarged plan view of region P1 in FIG. 3 according to another exemplary embodiment of the present invention.
Figure 5B:
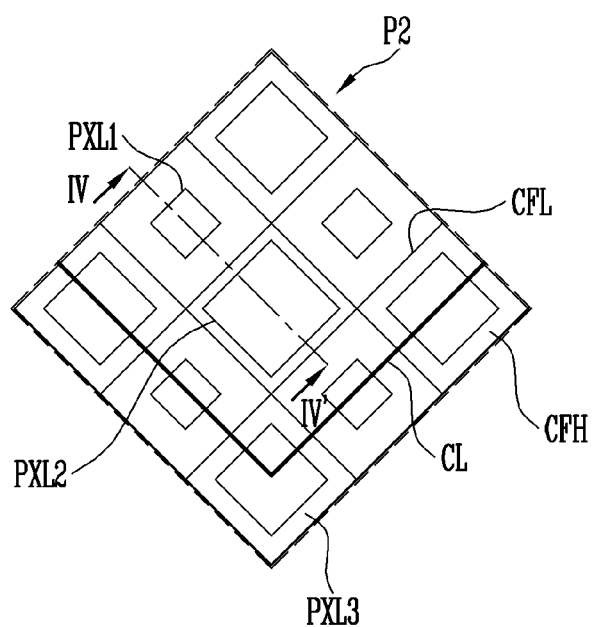
FIG. 5B is an enlarged plan view of region P2 in FIG. 5A.
Figure 5C:
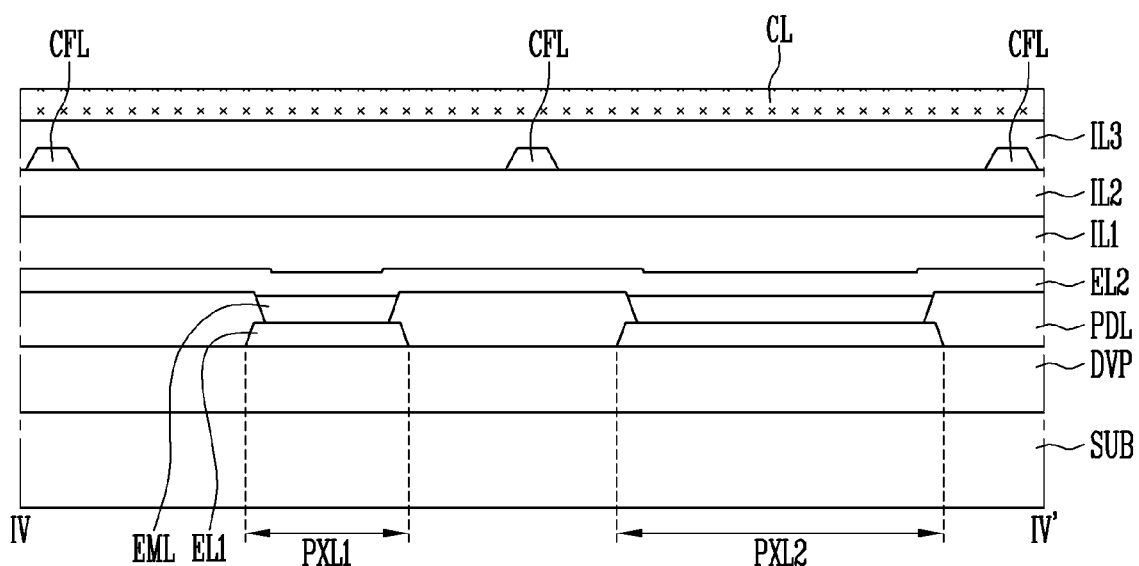
FIG. 5C is a cross-sectional view taken along line IV-IV' of FIG. 5B.

FIG. 5A is an enlarged plan view of region P1 in FIG. 3 according to another exemplary embodiment. FIG. 5B is an enlarged plan view of region P2 in FIG. 5A. FIG. 5C is a cross-sectional view taken along line IV-IV' of FIG. 5B.

Figure 6A:
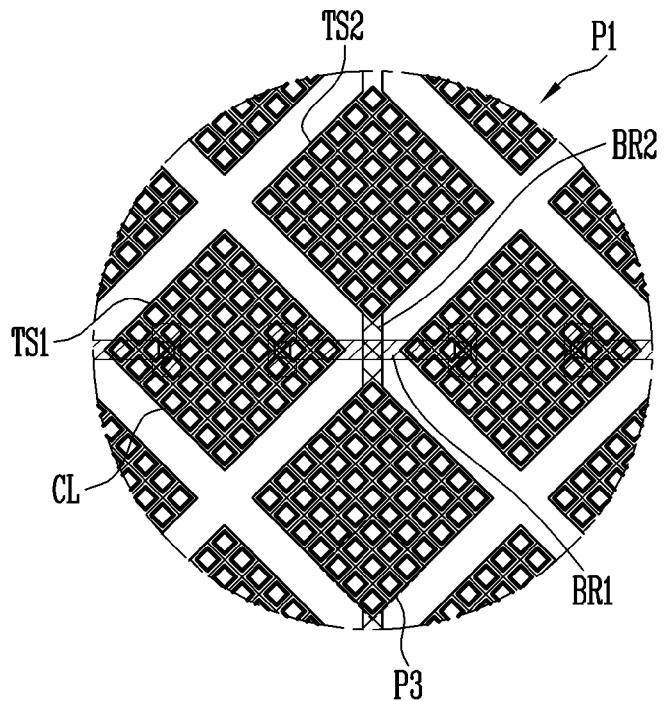
FIG. 6A is an enlarged plan view of region P1 in FIG. 3 according to another exemplary embodiment of the present invention.
Figure 6B:
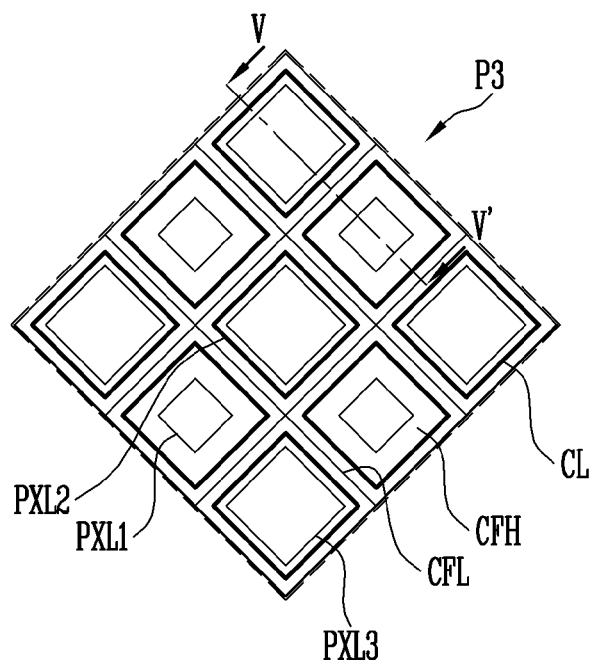
FIG. 6B is an enlarged plan view of region P3 in FIG. 6A.
Figure 6C:
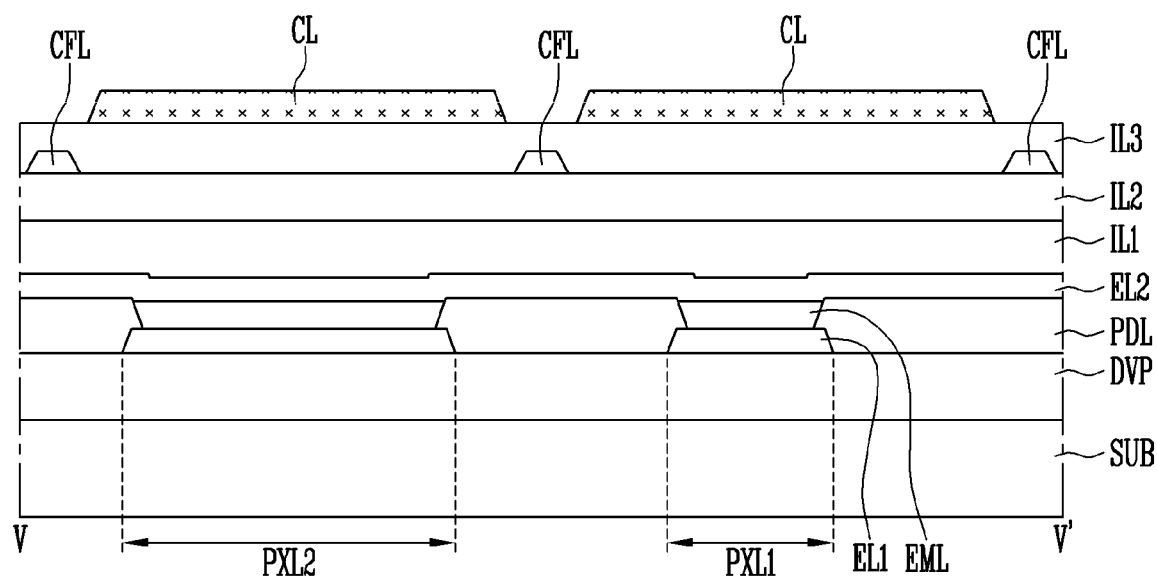
FIG. 6C is a cross-sectional view taken along line V-V of FIG. 6B.

In addition, FIG. 6A is an enlarged plan view of region P1 in FIG. 3 according to another exemplary embodiment. FIG. 6B is an enlarged plan view of region P3 in FIG. 6A. FIG. 6C is a cross-sectional view taken along line V-V of FIG. 6B.

Referring to FIGS. 5A to 5C, at least a portion of the sensing electrodes TS1 and TS2 includes a conductive fine line CFL forming a mesh shape. The conductive fine line CFL may include a metal layer. As described above, the metal layer may include at least one of copper (Cu), silver (Ag), gold (Au), platinum (Pt), palladium (Pd), nickel (Ni), tin (Sn), aluminum (Al), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), Bismuth (Bi), antimony (Sb), lead (Pb), and the like. However, a material of the conductive fine line CFL is not limited thereto, and the conductive fine line CFL may also be manufactured using the conductive polymer.

The conductive fine line CFL may have a single layer structure or a multilayer structure. For example, the conductive fine line CFL may have a three-layer structure of titanium (Ti)/aluminum (Al)/titanium (Ti).

When the conductive fine line CFL includes silver, aluminum, copper, chromium, nickel, titanium, and the like capable of low temperatures process, the input sensing unit TSP may be formed on the display unit in a continuous process. This is because the organic material included in the display unit is not likely to be deformed in the low temperature process.

When the sensing electrodes TS1 and TS2 include a conductive fine line CFL forming a mesh shape, the flexibility of the sensing electrodes TS1 and TS2 and the input sensing unit TSP including the same may be improved.

In addition, when the conductive fine line CFL in the sensing electrodes TS1 and TS2 includes a metal layer, the conductive fine line CFL forming a mesh shape may not be visible to the user.

The conductive fine line CFL may have a thickness in a range of about 2 μm to about 4 μm, and one side of a mesh hole CFH formed by intersecting conductive fine lines CFL may have a length in a range of about 25 μm to 35 μm. When the mesh hole CFH and the conductive fine line CFL have the size as described above, the sensing electrodes TS1 and TS2 may not be visible to the user even when the conductive fine line CFL includes the metal layer, which is not optically transparent.

When the display unit includes a plurality of pixel units PXL1, PXL2 and PXL3, the mesh hole CFH formed by the intersecting conductive fine lines CFL and each of the pixel units PXL1, PXL2 and PXL3 may correspond one-to-one. In this case, 'correspond one=to-one' may refer that only one pixel unit overlaps one mesh hole CFH in a plan view. However, one mesh hole CFH may overlap a plurality of pixel units PXL1, PXL2, and PXL3 in a plan view according to the size and shape of the mesh hole CFH and the pixel units PXL1, PXL2, and PXL3.

When the sensing electrodes TS1 and TS2 include the conductive fine line CFL forming the mesh shape, the conductive pattern CL may have various shapes.

For example, as shown in FIGS. 5A to 5C, the conductive pattern CL may cover a plurality of mesh holes CFH. In this case, the conductive pattern CL may overlap the conductive fine line CFL in a plan view. Specifically, referring to FIG. 5C, the conductive fine line CFL does not overlap the first pixel unit PXL1 and the second pixel unit PXL2 in a plan view, and the conductive pattern CL is entirely formed. Even at this time, two or more conductive patterns CL disposed on the different sensing electrodes TS1 and TS2 are spaced apart from each other.

Referring to FIGS. 6A to 6C, the conductive pattern CL may be provided on a mesh hole CFH formed by intersecting conductive fine lines CFL forming the mesh shape. Particularly, according to the present exemplary embodiment, a plurality of conductive patterns CL are provided on one of the sensing electrodes TS1 and TS2, and each of conductive patterns CL is disposed to not overlap the conductive fine line CFL in a plan view. In particular, a plurality of conductive patterns CL may be spaced apart from each other with the conductive fine line CFL interposed therebetween, in a plan view.

Referring to FIG. 6B, the mesh hole CFH and the conductive pattern CL correspond one-to-one. More particularly, one conductive pattern CL may not exceed a boundary of one mesh hole CFH. In addition, according to an exemplary embodiment shown in FIG. 6B, one of pixel units PXL1, PXL2, and PXL3 is provided in one mesh hole CFH, so that one of pixel units PXL1, PXL2, and PXL3 corresponds to the conductive pattern CL one-by-one. As described above, since the conductive pattern CL has excellent transmittance, light emitted from the pixel units PXL1, PXL2, and PXL3 is not distorted and luminance of the light may not decrease, even when the conductive pattern CL overlaps the pixel units PXL1, PXL2, and PXL3 in a plan view.

A driver DVP of the display unit is provided under the first electrode EL1. Although not shown in the drawing, the driver DVP includes elements for driving the pixel units PXL1 and PXL2. For example, the driver DVP may include a thin film transistor. The thin film transistor may include an active pattern, a gate electrode, a source electrode, and a drain electrode. The driver DVP may further include a buffer layer provided on the substrate SUB.

The buffer layer may prevent a diffusion of metal atoms or impurities (e.g., outgassing) from the substrate SUB, and may control a transfer rate of heat during a crystallization process for forming the active pattern, to obtain a substantially uniform active pattern. In addition, the buffer layer may improve flatness of a surface of the substrate SUB when a surface of the substrate SUB is not uniform. According to the type of substrate SUB, more than one buffer layer may be provided on the substrate SUB, or a buffer layer may be omitted.

The active pattern is provided on the buffer layer. The active pattern may include an oxide semiconductor, an inorganic semiconductor (for example, amorphous silicon or poly silicon), or an organic semiconductor.

A gate insulating layer may be disposed on the active pattern. The gate insulating layer covers the active pattern. The gate insulating layer may be disposed entirely on the substrate. The gate insulating layer may be formed of various insulating materials, such as silicon oxide, silicon nitride, metal oxide, and the like.

The gate electrode may be disposed on a portion of the gate insulating layer, on which the active pattern is disposed, under the gate insulating layer. The gate electrode may include metal, an alloy, metal nitride, conductive metal oxide, a transparent conductive material, and the like.

The interlayer insulating layer may be disposed on the gate electrode. The interlayer insulating layer may cover the gate electrode in a light emitting region and may extend in one direction on the substrate SUB. That is, the interlayer insulating layer may be entirely disposed on the substrate SUB. The interlayer insulating layer may include a silicon compound, metal oxide, or the like.

A source electrode and a drain electrode may be disposed on the interlayer insulating layer. The source electrode and the drain electrode may be respectively connected to one side and the other side of the active pattern through a portion of the gate insulating layer and the interlayer insulating layer. Each of the source electrode and the drain electrode may include metal, an alloy, metal nitride, conductive metal oxide, a transparent conductive material, and the like.

A passivation layer may be disposed on the source electrode and the drain electrode. The passivation layer may cover the source electrode and the drain electrode in the light emitting region and may extend in one direction on the substrate SUB. That is, the passivation layer may be disposed entirely on the substrate SUB. The passivation layer may include a silicon compound, metal oxide, or the like.

The first electrode EL1 may be disposed on the passivation layer. The first electrode EL1 may be connected to the drain electrode through portions of the passivation layer. The first electrode EL1 may be an anode having a high work function, and may include metal, an alloy, metal nitride, conductive metal oxide, a transparent conductive material, or the like.

The pixel definition layer PDL may be disposed on the passivation layer while exposing portions of the first electrode EL1. The pixel definition layer PDL may include an organic material or an inorganic material. In this case, an emission layer EML may be provided on at least a portion of the first electrode EL1 exposed by the pixel definition layer PDL.

In an exemplary embodiment, only the emission layer EML may be formed on the first electrode EL1. However, the inventive concepts are not limited thereto, and an organic layer having a different function, for example, a hole injection layer, a hole transporting layer, an electron transporting layer, an electron injection layer, or the like may be further formed on the first electrode EL1. In addition, at least one of the hole injection layer, the hole transporting layer, the electron transporting layer, and the electron injection layer may be omitted. The emission layer may emit light of various colors depending on a type of the pixel units PXL1, PXL2, and PXL3. For example, the emission layer may emit light of any one of red, blue, and red, but it is not limited thereto, and light of other colors may be emitted.

The second electrode EL2 may be disposed on the pixel definition layer PDL and the emission layer EML. The second electrode EL2 may cover the pixel definition layer PDL and the emission layer EML, and may extend in one direction on the substrate SUB. The second electrode EL2 may be a cathode and may include a material having a low work function. The second electrode EL2 may include metal, an alloy, metal nitride, a conductive metal oxide, a transparent conductive material, or the like. These may be used alone or in combination with each other.

In the pixel units PXL1 and PXL2 including the first electrode EL1, when a voltage is applied to each of the first electrode EL1 and the second electrode EL2, a hole injected from the first electrode EL1 is transferred to the emission layer EML, and an electron injected from the second electrode EL2 is transferred to the emission layer EML. The electron and the hole are recombined in the emission layer EML to generate an exciton, and the exciton emit during transition from an excited state to a ground state.

A plurality of the pixel units PXL1, PXL2, and PXL3 may emit light of different wavelengths. For example, the first pixel unit PXL1 may emit green light, the second pixel unit PXL2 may emit blue light, and the third pixel unit PXL3 may emit red light. However, the light emitted from the pixel units PXL1, PXL2, and PXL3 may be magenta light, yellow light, cyan light, white light, or the like, in addition to the examples described above.

A size of the pixel units PXL1, PXL2, and PXL3 may be changed according to a wavelength band of light emitted from the pixel units PXL1, PXL2, and PXL3. For example, referring FIG. 5B, a size of the first pixel unit PXL1 is smaller than a size of the second pixel unit PXL2 or the third pixel unit PXL3. However, the shapes of the pixel units PXL1, PXL2, and PXL3 may be variously changed in a circle, a rectangle, a rhombus, or the like, as shown in FIG. 5B.

According to an exemplary embodiment of the present invention, the input sensing unit TSP may have flexibility. When the sensing electrodes TS1 and TS2 and the conductive pattern CL include a conductive polymer, and the first to third insulating layers ILL IL2, and IL3 include an insulating polymer, the input sensing unit TSP may have excellent flexibility. Particularly, when the conductive pattern CL, the sensing electrodes TS1 and TS2, and the insulating layers ILL IL2, and IL3 all include a polymer compound, the input sensing unit TSP may be manufactured by a continuous deposition process in the same chamber. As a result, the amount of process equipment and process time may be reduced.

As shown in FIG. 5A or 6A, when the sensing electrodes TS1 and TS2 include a conductive fine line CFL forming a mesh shape, the sensing electrodes TS1 and TS2 and the input sensing unit TSP have flexibility. Particularly, the flexibility of the sensing electrodes TS1 and TS2 and the input sensing unit TSP may be improved, when the conductive fine line CFL forming a mesh shape includes metal having a large ductility.

The input sensing unit TSP having flexibility may be provided on the display unit PP and the substrate SUB having flexibility. Therefore, the total display device may have flexibility.

FIGS. 7A to 7D are plan views illustrating a sensing electrode and a conductive layer according to exemplary embodiments of the present invention.

As shown in FIGS. 7A to 7D, the conductive pattern CL may have various shapes.

Figure 7A:
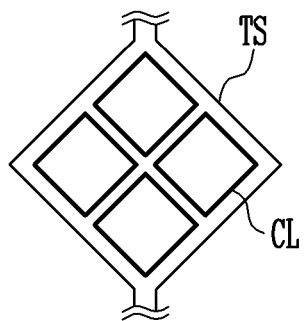
FIG. 7A, FIG. 7B, FIG. 7C, and FIG. 7D are plan views illustrating a sensing electrode and a conductive layer according to exemplary embodiments of the present invention.
Figure 7B:
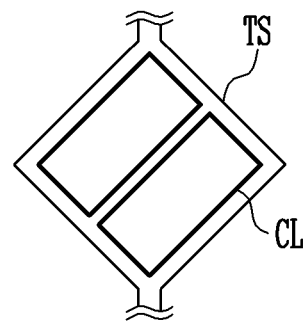
Figure 7C:
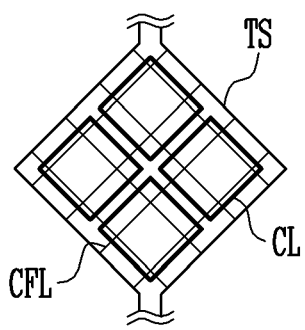

First, referring to FIGS. 7A to 7C, a plurality of conductive patterns CL spaced apart from each other may be provided on one sensing electrode TS. One sensing electrode TS may either be a receiving electrode or a driving electrode. The number of conductive patterns CL provided on one sensing electrode TS may be varied. In addition, when a plurality of conductive patterns CL are provided on one sensing electrode TS, the size of each of the conductive patterns CL may be the same or different from each other. In addition, the shape of each of the conductive patterns CL may be the same or different from each other. The shape of the conductive pattern CL may be varied. For example, the conductive pattern CL may have a closed polygon having a side with a straight line, a circle and an ellipse having a side with a curved line, and a semicircle and a semi-ellipse having a side with a straight line and a curved line, and the like.

Figure 7D:
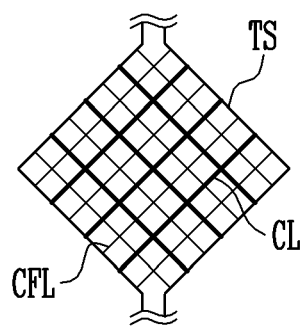

In addition, referring to FIG. 7D, the conductive pattern CL may have a mesh shape. The mesh-shaped conductive pattern CL may be disposed to cross the mesh-shaped conductive fine line CFL as shown in FIG. 7D, but may be disposed to overlap the conductive fine line CFL in another exemplary embodiment.

When the conductive pattern CL has a mesh shape, the conductive pattern CL may be formed of metal or an alloy. In an exemplary embodiment of the present invention, the metal may include copper (Cu), silver (Ag), gold (Au), platinum (Pt), palladium (Pd), nickel (Ni), tin (Sn), aluminum (Al), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), Bismuth (Bi), antimony (Sb), lead (Pb), or the like.

The shape of the conductive pattern CL does not depend on the shape of the sensing electrode TS. Therefore, various combinations other than those described in FIGS. 7A to 7D are possible. For example, when both the sensing electrode TS and the conductive pattern CL have a mesh shape as shown in FIG. 7D, however, the sensing electrode TS may have a plate shape and the conductive pattern CL may have a mesh shape. In this case, however, the mesh-shaped conductive pattern CL does not extend beyond a boundary of the sensing electrode TS.

Figure 8:
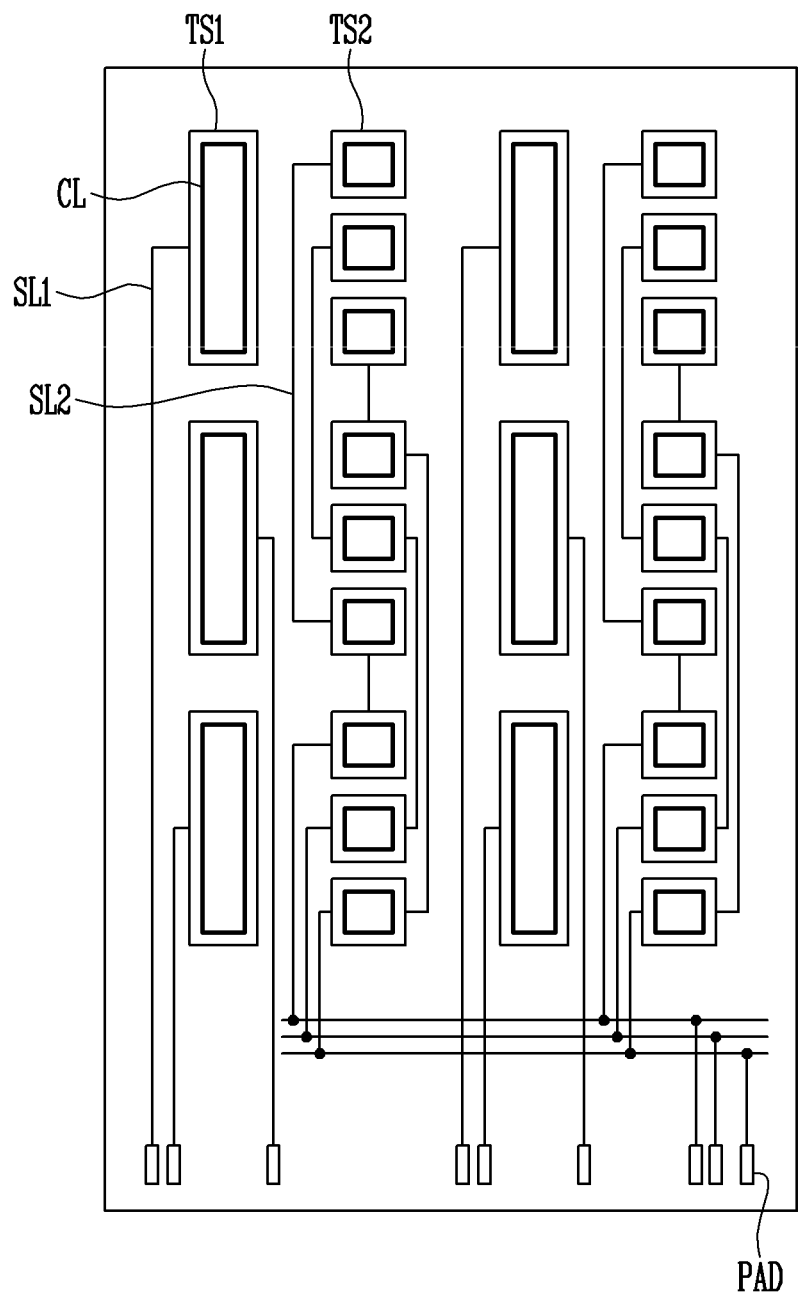
FIG. 8 is a plan view for illustrating an input sensing unit according to another exemplary embodiment of the present invention.

FIG. 8 is a plan view for illustrating an input sensing unit according to another exemplary embodiment of the present invention.

Referring to FIG. 8, a plurality of first sensing electrodes TS1 and a plurality of second sensing electrodes TS2 are provided in the input sensing unit TSP.

A plurality of first sensing electrodes TS1 form a first sensing electrode column extending in a first direction. In addition, a plurality of second sensing electrode TS2 form a second sensing electrode column extending in the first direction. Accordingly, the first sensing electrode TS1 and the second sensing electrode TS2 may be disposed in the first direction. The first sensing electrode column and the second sensing electrode column are alternately disposed in the input sensing unit TSP.

Referring to FIG. 8, three first sensing electrodes TS1 are provided in one first sensing electrode column and nine second sensing electrodes TS2 are provided in one second sensing electrode column. However, the quantity of the first sensing electrode TS1 and the second sensing electrode TS2 are merely exemplary, and more or fewer first and second sensing electrodes TS1 and TS2 may be provided depending on the size of the input sensing unit TSP. The number of sensing electrode columns may also be greater or less than that shown in FIG. 8.

Since the number of the second sensing electrodes TS2 is greater than the number of the first sensing electrodes TS1, one first sensing electrode TS1 may correspond to a plurality of the second sensing electrodes TS2. In this case, 'correspond to' may refer that one first sensing electrode TS1 forms a capacitance with a plurality of second sensing electrodes TS2.

One of the first sensing electrode TS1 and the second sensing electrode TS2 may be a driving electrode for receiving a driving signal from the controller. The other of the first sensing electrode TS1 and the second sensing electrode TS2 may be a receiving electrode for transmitting an external sensing signal, such as a user's touch, to the controller. For example, the first sensing electrode TS1 may be a driving electrode, and the second sensing electrode TS2 may be a receiving electrode. Alternatively, the first sensing electrode TS1 may be a receiving electrode, and the second sensing electrode TS2 may be a driving electrode. The controller recognizes the touch by recognizing the sensing signal received from the receiving electrode.

The first sensing electrode TS1 is connected to the pad unit PAD through a first connecting line SL1, and the second sensing electrode TS2 is connected to the pad unit PAD through a second connecting line SL2.

Particularly, one second sensing electrode TS2 may be connected to another adjacent second sensing electrode TS2 through the second connecting line SL2. Specifically, when k-th first sensing electrode TS1 corresponds to "i" second sensing electrodes TS2, the j-th second sensing electrode TS2 corresponding to the k-th first sensing electrode TS1 is connected to the |i−j+1|-th second sensing electrode TS2 corresponding to 1-th first sensing electrode TS1 disposed adjacent to the k-th first sensing electrode TS1 in the first direction through the second connecting line SL2.

For example, referring to the exemplary embodiment shown in FIG. 8, each of the first sensing electrodes TS1 corresponds to three second sensing electrodes TS2. In this case, the first one of the second sensing electrodes TS2 corresponding to the first one of the first sensing electrodes TS1, disposed at the uppermost position, is electrically connected to the (3−1+1)-th second sensing electrodes TS2 corresponding to the second one the first sensing electrodes TS1.

Since the second sensing electrode TS2 has the above-described structure, the number of the second connecting lines SL2 for connecting the second sensing electrode TS2 to the pad unit PAD may be greatly reduced. Specifically, referring to the exemplary embodiment shown in FIG. 8, nine second sensing electrodes TS2 may be connected to the pad unit through only three second connecting lines SL2. As a result, an area occupied by the second connecting line SL2 is reduced, and more sensing electrodes may be formed in the same area. As the number of sensing electrodes increases, the touch sensitivity sensed by the input sensing unit may be improved.

In the exemplary embodiment shown in FIG. 8, the first connecting line SL1 and the second connecting line SL2 may be provided in the same layer as the first sensing electrode TS1 and the second sensing electrode TS2.

The first sensing electrode TS1 and the second sensing electrode TS2 may include a conductive polymer, metal, or the like, as described with reference to FIGS. 3 to 6C. In addition, the first sensing electrode TS1 and the second sensing electrode TS2 may have a single layer structure or a multilayer structure. In FIG. 8, the shape and material of the first sensing electrode TS1 and the second sensing electrode TS2 may be the same as those described with reference to FIGS. 3 to 6C.

In the case of FIG. 8, each of the first sensing electrode TS1 and the second sensing electrode TS2 may include a mesh-shaped conductive fine line.

Referring to FIG. 8, the conductive pattern CL is disposed on each of the first sensing electrode TS1 and the second sensing electrode TS2. The conductive pattern CL disposed on the first sensing electrode TS1 and the conductive pattern CL disposed on the second sensing electrode TS2 are spaced apart from each other. The conductive pattern CL overlaps at least one portion of the sensing electrodes TS1 and TS2 in a plan view, and is not disposed beyond a boundary of the sensing electrodes TS1 and TS2.

When the sizes of the first sensing electrode TS1 and the second sensing electrode TS2 are different from each other, the sizes of the conductive patterns CL disposed on each of the first sensing electrode TS1 and the second sensing electrode TS2 may also be different from each other. For example, when the size of the first sensing electrode TS1 is greater than the size of the second sensing electrode TS2, the size of the conductive pattern CL disposed on the first sensing electrode TS1 may be greater than the size of the conductive pattern CL disposed on the second sensing electrode TS2. Generally, since the number of the first sensing electrodes TS1 is less than the number of the second sensing electrodes TS2, the size of the first sensing electrode TS1 may be greater than the size of the second sensing electrode TS2, when one of the first sensing electrodes TS1 corresponds to a plurality of the second sensing electrodes TS2. However, the size of the conductive pattern CL is not necessarily proportional to the size of the sensing electrode. For example, according to an exemplary embodiment, when the size of the first sensing electrode TS1 is greater than that of the second sensing electrode TS2, and when the size of the conductive pattern CL disposed on the first sensing electrode TS1 and the size of the conductive pattern CL disposed on the second sensing electrode TS2 are the same, a plurality of conductive patterns CL may be spaced apart from each other on the first sensing electrode TS1.

Figure 9A:
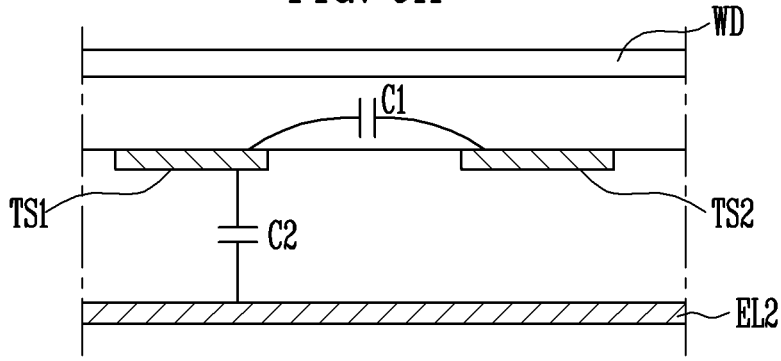
FIG. 9A and FIG. 9B are cross-sectional views conceptually showing a principle of sensing a touch in a display device according to a comparative example.
Figure 9B:
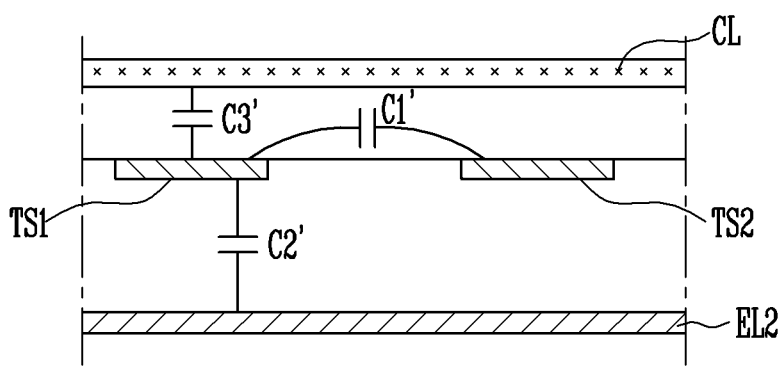
Figure 9C:
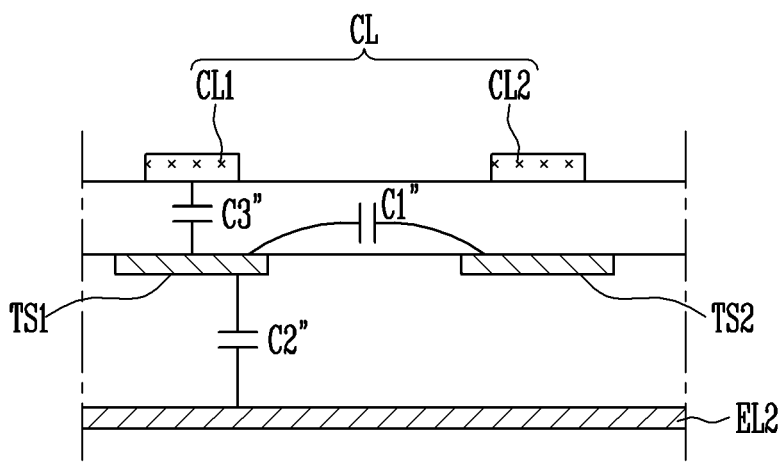
FIG. 9C is a cross-sectional view conceptually showing a principle of sensing a touch in a display device according to an exemplary embodiment of the present invention.

FIGS. 9A to 9B are cross-sectional views conceptually showing a principle of sensing a touch in a display device according to a comparative example. FIG. 9C is a cross-sectional view conceptually showing a principle of sensing a touch in a display device according to an exemplary embodiment of the present invention.

Figure 10A:
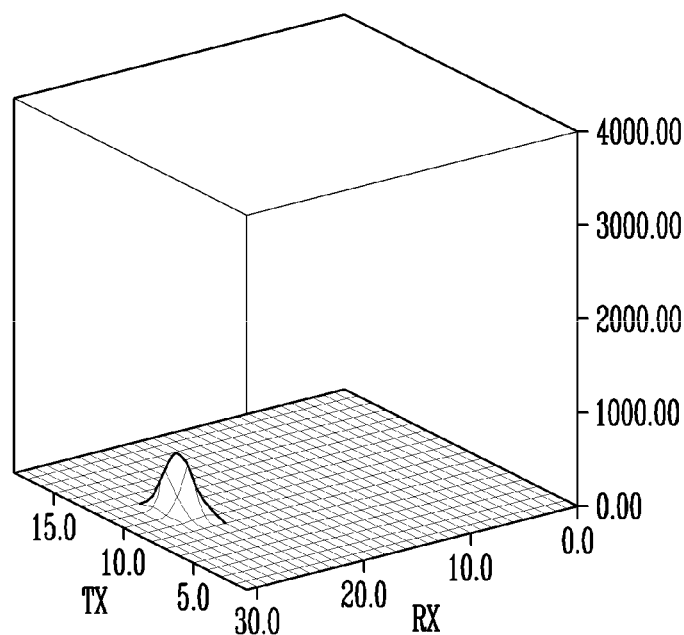
FIG. 10A and FIG. 10B are graphs showing touch sensitivity of a display device according to a comparative example.
Figure 10B:
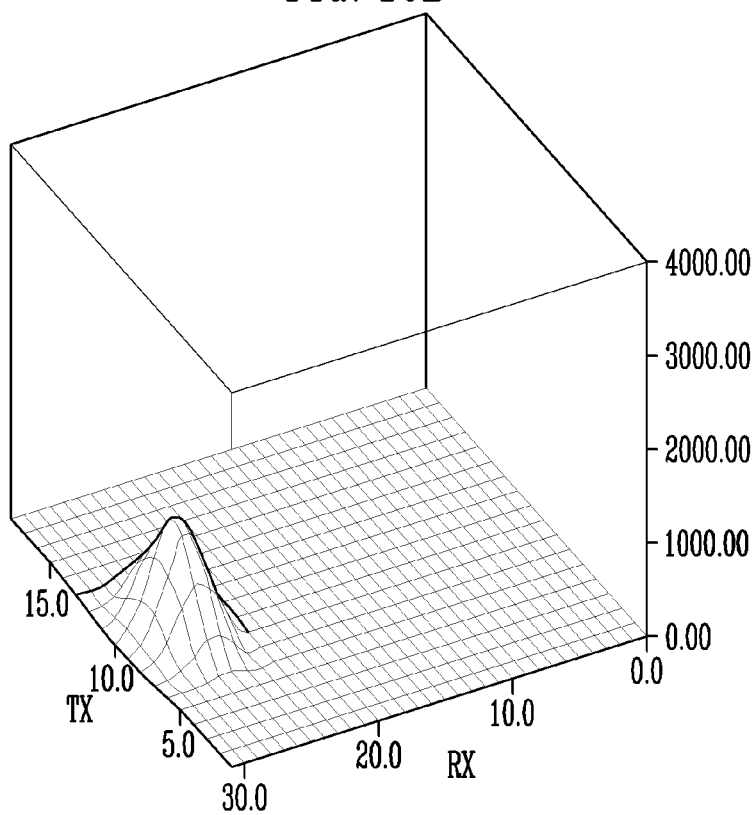

In addition, FIGS. 10A to 10B are graphs showing touch sensitivity in a display device according to a comparative example. FIG. 10C is a graph showing touch sensitivity in a display device according to an exemplary embodiment of the present invention.

For convenience of description, elements other than the first sensing electrode TS1, the second sensing electrode TS2, the second electrode EL2, and the conductive pattern CL are omitted in FIGS. 9A to 9C.

In FIG. 9A, a capacitor formed between the first sensing electrode TS1 and the second sensing electrode TS2 is referred to as a first capacitor C1, and a capacitor formed between the second electrode EL2 and the first sensing electrode TS1 and/or the second sensing electrode TS2 is referred to as a second capacitor C2.

When there is no user's touch, the first capacitor C1 having a first capacitance is formed between the first sensing electrode TS1 and the second sensing electrode TS2, and the second capacitor C2 having a second capacitance is formed between the second electrode EL2 and the first sensing electrode TS1 and/or the second sensing electrode TS2.

The second capacitance is a value between the second electrode EL2 and the first sensing electrode TS1 and/or the second sensing electrode TS2, which may change according to a voltage and resistance applied to each portion of the second electrode EL2. However, the distance between the second electrode EL2 and the first sensing electrode TS1 and/or the second sensing electrode TS2 may be formed to be very narrow in recent display devices. Accordingly, an influence of the second electrode EL2 on the first sensing electrode TS1 and/or the second sensing electrode TS2 changes depending on a position of a voltage applying unit for applying a voltage to the second electrode EL2. When the voltage applying unit is provided at the same side as the controller, the influence of the second electrode EL2 on the first sensing electrode TS1 and/or the second sensing electrode TS2 decreases as the distance between the second electrode EL2 and the voltage applying unit increases. As a result, the first capacitance of the first capacitor C1 formed between the first sensing electrode TS1 and the second sensing electrode TS2 increases as the distance between the sensing electrode and a touch sensor unit (not shown) increases. For example, a portion of the first capacitance that is closer to the touch sensor unit has a small value, and another portion of the first capacitance that is relatively further from the touch sensor unit has a large value.

When a user touches a surface of a window WD, a capacitor having a capacitance is also formed between the user's hand and the first sensing electrode TS1 and/or the second sensing electrode TS2, in addition to the first capacitor C1 and the second capacitor C2. In this case, the first capacitance of the first capacitor C1 changes because of the capacitor formed due to the user's touch. As used herein, "the user's touch" may refer to not only a touch of the user's finger, but also a touch by another tool (e.g., a stylus pen).

When a change amount of the first capacitance due to the user's touch is referred to as a first capacitance change amount (AC1), the touch sensor unit receives a changed first capacitance, and recognizes the user's touch by deriving AC1/C1 based on the changed first capacitance. Since a portion of the first capacitance relatively closer to the touch sensor unit has a small value, and another portion of the first capacitance relatively further from the touch sensor unit has a large value, the AC1/C1 calculated by the touch sensor unit has a smaller value as the distance between the sensing electrode and the touch sensor unit increases. As a result, when determining whether a touch event has occurred through the change amount of the first capacitance, the touch sensitivity decreases as the distance between the sensing electrode and the touch sensor unit increases.

According to an exemplary embodiment, the input sensing unit of FIG. 9B solves the conventional problem of the change in touch sensitivity depending on the distance between the touch sensor unit and the sensing electrode.

In FIG. 9B, a capacitor formed between the first sensing electrode TS1 and the second sensing electrode TS2 is referred to as a first capacitor C1', a capacitor formed between the second electrode EL2 and the first sensing electrode TS1 and/or the second sensing electrode TS2 is referred to as a second capacitor C2', and a capacitor formed between the conductive pattern CL and the first sensing electrode TS1 and/or the second sensing electrode TS2 is referred to as a third capacitor C3'.

When no user's touch occurs, the first capacitor C1' having a first capacitance is formed between the first sensing electrode TS1 and the second sensing electrode TS2, and the second capacitor C2' having a second capacitance is formed between the second electrode EL2 and the first sensing electrode TS1 and/or the second sensing electrode TS2. In addition, the third capacitor C3' is formed between the conductive pattern CL and the first sensing electrode TS1 and/or the second sensing electrode TS2, and the third capacitor C3' releases at least a portion of the charge held in the second capacitor C2' between the second electrode EL2 and the first sensing electrode TS1 and/or the second sensing electrode TS2. The charge may be stored between the first sensing electrode TS1 and/or the second sensing electrode TS2 and the conductive pattern CL, thereby reducing the second capacitance.

When a user's touch occurs, the user's touch is made on the conductive pattern CL. Charges released from the second capacitor C2' may be discharged through a user's finger or the like, which is grounded. In this case, as the second capacitance of the second capacitor C2' decreases, the influence of the second electrode EL2 on the first capacitance of the first capacitor C1' decreases. Therefore, when the voltage applying unit is provided on the same side as the controller, the influence of the second electrode EL2 on the first sensing electrode TS1 and/or the second sensing electrode TS2 may become substantially similar throughout various portions of the second electrode EL2. As a result, the first capacitance of the first capacitor formed between the first sensing electrode TS1 and the second sensing electrode TS2 does not significantly change even if the distance between the sensing electrode and the touch sensor unit (not shown) increases. For example, a portion of the first capacitance relatively closer to the touch sensor unit and another portion of the first capacitance relatively further from the touch sensor unit have similar values.

As a result, the sensing signal value AC1'/C1' sensed by the touch sensor unit is not largely affected by the position of the sensing electrode, and is maintained at a relatively uniform value.

However, as shown in FIG. 9B, when the conductive pattern CL is disposed over the two sensing electrodes TS1 and TS2 without being spaced apart, capacitance interference may occur due to the conductive pattern CL. Specifically, when the conductive pattern CL is entirely disposed to cover the plurality of sensing electrodes TS1 and TS2, the capacitance of the third capacitor C3' formed between the conductive pattern CL and the sensing electrode TS1 and/or the second sensing electrode TS2 may become excessively large.

The capacitance of the third capacitor C3' may affect the sensing signal value sensed by the sensor controller. Specifically, the C1' may greatly increase in the sensing signal value AC1'/C1' sensed by the touch sensor unit as the capacitance of the third capacitor C3' increases. Accordingly, even if AC1' increases due to charge induction through the conductive pattern CL, the sensing signal value AC1'/C1' may be decreased.

This phenomenon may be particularly noticeable when the distance between the conductive pattern CL and the first sensing electrode TS1 and/or the second sensing electrode TS2 is reduced. As will be described in more detail below, according to an exemplary embodiment of the present invention, a window is not provided in the display device, and the conductive pattern CL may function as a window. In this case, as the window is omitted, the distance between the first sensing electrode TS1 and/or the second sensing electrode TS2 and the conductive pattern CL may become less, and the capacitance of the third capacitor C3' may become greater.

The input sensing unit of FIG. 9C according to an exemplary embodiment solves a problem that may occur in the input sensing units shown in FIGS. 9A and 9B.

Referring to FIG. 9C, a first conductive pattern CL1 and a second conductive pattern CL2 spaced apart from each other are disposed on the first sensing electrode TS1 and the second sensing electrode TS2, respectively.

The first conductive pattern CL1 and the second conductive pattern CL2 release charges held by the second capacitor C2", thereby reducing the influence of the second electrode EL2 on the sensing signal value AC1"/C1". Therefore, the touch sensitivity may be uniform in all regions of the input sensing unit.

In addition, the first conductive pattern CL1 and the second conductive pattern CL2 guide the charges to the user's finger or the like when a user touches, thereby increasing a first capacitance change amount AC1" by the user's touch.

Furthermore, referring to FIG. 9C, since the first conductive pattern CL1 and the second conductive pattern CL2 are provided apart from each other, capacitance interference due to the conductive pattern may be prevented. As a result, the first capacitance C1" may be prevented from becoming too large. The first capacitance change amount C1" increases, and the first capacitance C1" does not change significantly, and thus, the sensing signal value AC1"/C1" may be increased. Therefore, according to an exemplary embodiment the present invention, by including the conductive patterns CL1 and CL2 spaced apart from each other, the touch sensitivity may be uniform in all regions of the input sensing unit, and the touch sensitivity may be improved.

FIGS. 10A to 10C are graphs showing touch sensitivity of an input sensing unit according to FIGS. 9A to 9C, respectively.

In the graphs, the axis labeled Tx denotes the driving electrode coordinates, and the axis labeled Rx denotes the receiving electrode coordinates. The axis perpendicular to the Tx and Rx axes denotes the touch sensitivity AC1/C1.

Referring to the graphs, it may be seen that the touch sensitivity is the lowest smallest in FIG. 10A, which does not include the conductive pattern CL as shown in FIG. 9A. This is because the charge induction effect by the conductive pattern CL does not occur as described above.

Referring to FIG. 10B, the charge induction effect may be obtained by including the conductive pattern CL. However, since the conductive pattern CL is entirely formed over a plurality of sensing electrodes TS1 and TS2, the input signal selectivity is lowered. Specifically, referring to FIG. 10B, a sensing signal is detected over a relatively wide coordinate when there is the user's touch. When an input signal is detected over such wide coordinates, it may be difficult to calculate accurate touch coordinates. Accordingly, there is a limit in performing precise operation using the input sensing unit.

Referring to FIG. 10C, both the touch sensitivity and the input signal selectivity are excellent because the conductive patterns CL1 and CL2 are spaced apart from each other. Therefore, when there is the user's touch, accurate touch coordinates may be calculated. Therefore, a more precise operation may be performed using the input sensing unit.

FIGS. 11 to 14 are cross-sectional views of a display device according to an exemplary embodiment of the present invention. Referring to FIGS. 11 to 14, the stacking structure of elements in the display device according to an exemplary embodiment of the present invention will be described. However, FIGS. 11 to 14 are merely illustrative, and various modifications may be made in addition to those described herein.

Figure 11:
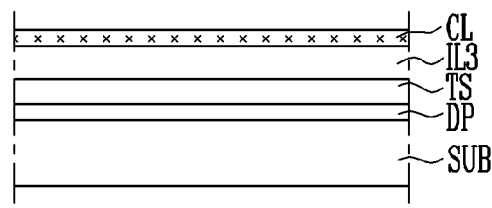
FIG. 11, FIG. 12, FIG. 13, and FIG. 14 are cross-sectional views of a display device according to an exemplary embodiment of the present invention.

According to FIG. 11, the substrate SUB, the display unit DP, the sensing electrode TS, the third insulating layer IL3, and the conductive pattern CL are sequentially provided. These elements are the same as those described above having the same reference numerals, and as such, duplicated description thereof will be omitted.

According to an exemplary embodiment of the present invention, the conductive pattern CL may function as the window of the display device. Therefore, the conductive pattern CL may protect the input sensing unit or the display unit DP from the external environment. The conductive pattern CL may have flexibility. When the conductive pattern CL includes a conductive polymer, the conductive pattern CL has excellent flexibility compared to a window formed by glass. Therefore, the display device according to an exemplary embodiment including the conductive pattern CL is suitable for use in a device requiring flexibility.

Figure 12:
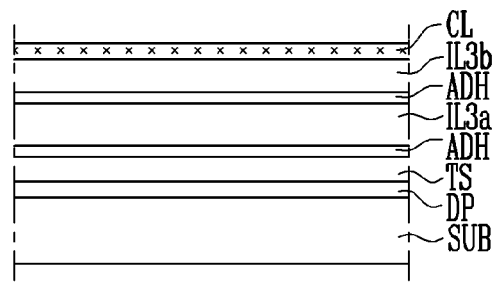

Referring to FIG. 12, a plurality of third insulating layers IL3a and IL3b are provided between the sensing electrode TS and the conductive pattern CL. An adhesive layer ADH may be provided between the plurality of third insulating layers IL3a and IL3b and the sensing electrode TS.

By providing the third insulating layers IL3a and IL3b in a multilayered structure, the flexibility of the display device may be increased. The material forming each of the third insulating layers IL3a and IL3b is as described above, but may further include polyimide particularly when the third insulating layers IL3a and IL3b are formed in a multilayered structure. Each of the third insulating layers IL3a and IL3b may have a thickness in a range of about 50 μm or less, or about 30 μm or less.

In addition, since the adhesive layer ADH is provided between the plurality of third insulating layers IL3a and IL3b and the sensing electrode TS, a stress may be relaxed. The adhesive layer ADH may further improve the flexibility of the display device by performing a function of buffering a compressive stress or a tensile stress applied when the display device is bent or warped.

Figure 13:
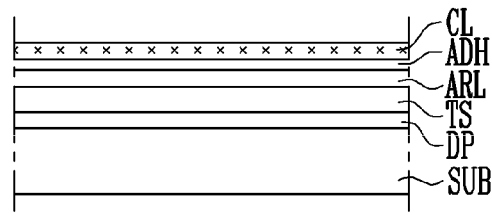

Referring to FIG. 13, in the display device, the third insulating layer may be omitted and an anti-reflection layer ARL may be provided. The anti-reflection layer ARL may prevent a reflection of external light by canceling out and extinguishing light incident from the outside. The anti-reflective layer ARL may be implemented as a polarizer, and may be provided as a single layer or a multiple layer. For example, the anti-reflective layer ARL may be provided as a single layer, which circularly polarizes light incident thereto, or may be provided as a multiple layer including a quarter-wave retardation layer.

The anti-reflection layer ARL may be provided in various forms, and is not particularly limited. For example, when the anti-reflective layer ARL is provided as a polarizer, the anti-reflective layer ARL may be provided in the form of a stretched polymer film, or may be provided in the form of a wire grid polarizer. The anti-reflection layer ARL may include a liquid crystal aligned in a predetermined direction.

The anti-reflection layer ARL may include a plurality of dielectric layers and a plurality of metal-containing layers. In this case, the metal-containing layer may function as a reflection layer, and the dielectric layer may control a condition of destructive interference. The metal-containing layer and the dielectric layer may be disposed alternately. When the anti-reflection layer ARL includes the first and second metal-containing layers and the first and second dielectric layers, a portion of light incident from the outside to the display device is reflected by the first and second metal-containing layers. The first dielectric layer stacked between the first metal-containing layer and the second metal-containing layer controls a phase so that a reflected light reflected by the first metal-containing layer and a reflected light reflected by the second metal-containing layer are shifted by about 180 degrees. Thus, the reflected light reflected by the first metal-containing layer and the reflected light reflected by the second metal-containing layer are cancelled out.

The anti-reflection layer ARL may be provided in various thicknesses. For example, according to an exemplary embodiment of the present invention, the anti-reflective layer ARL may have a thickness in a range of about 150 μm or less, or about 60 μm or less, or about 40 μm or less.

Figure 14:
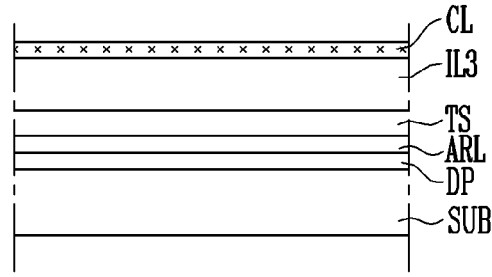

Referring to FIG. 14, the anti-reflection layer ARL is provided under the sensing electrode TS. Accordingly, the third insulating layer IL3 is provided between the sensing electrode TS and the conductive pattern CL. In this case, the third insulating layer IL3 may function as a base film for providing the sensing electrode of the input sensing unit.

The display device according to an exemplary embodiment of the present invention may be applied to various electronic devices. For example, the display device may be applied to a television, a notebook, a mobile phone, a smart phone, a smart pad, a PMP, a PDA, a navigation device, various wearable devices, such as a smart watch, and the like.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An input sensing unit comprising:
a plurality of capacitive sensing electrodes connected to a pad unit through connecting lines;
a conductive layer disposed on at least a portion of the sensing electrodes; and
an insulating member disposed between the conductive layer and the sensing electrodes,
wherein:
the conductive layer overlaps at least a portion of the sensing electrodes in a plan view;
the conductive layer comprises a plurality of conductive patterns spaced apart from each other;
the conductive patterns are not connected to any of the connecting lines; and
the conductive patterns are not connected to any other conductive member that is connected to the connecting lines.

2. The input sensing unit of claim 1, wherein the conductive patterns disposed on different sensing electrodes are spaced apart from each other.

3. The input sensing unit of claim 2, wherein a distance between the conductive patterns is greater than a distance between the sensing electrodes.

4. The input sensing unit of claim 1, further comprising:
a first region in which the sensing electrodes are disposed; and
a second region in which the sensing electrodes are not disposed,
wherein the conductive patterns are disposed only in the first region.

5. The input sensing unit of claim 1, wherein the conductive patterns have a mesh shape.

6. The input sensing unit of claim 1, wherein:
the conductive patterns comprises conductive metal oxide; and
the conductive metal oxide comprises at least one of indium tin oxide (ITO), indium zinc oxide (IZO), antimony zinc oxide (AZO), indium tin zinc oxide (ITZO), zinc oxide (ZnO), tin oxide ($SnO_2$), and mixtures thereof.

7. The input sensing unit of claim 1, wherein:
the sensing electrodes comprise:
a first sensing electrode; and
a second sensing electrode spaced apart from the first sensing electrode and forming a capacitance with the first sensing electrode;
the first sensing electrode and the second sensing electrode are provided in plural, respectively;
the input sensing unit further comprises:
a first connector connecting the first sensing electrodes adjacent to each other; and
a second connector connecting the second sensing electrodes adjacent to each other;
the first sensing electrodes and the second sensing electrodes are disposed on the same layer; and
one of the first connector and the second connector is disposed on the same layer as the first sensing electrodes and the second sensing electrodes.

8. The input sensing unit of claim 7, wherein the conductive pattern disposed on the first sensing electrodes and the conductive pattern disposed on the second sensing electrodes are spaced apart from each other.

9. The input sensing unit of claim 1, wherein:
the sensing electrode comprises a first sensing electrode column comprising a plurality of first sensing electrodes arranged in a first direction; and
a second sensing electrode column comprising a plurality of second sensing electrodes arranged in the first direction and extending in the first direction;
the first sensing electrode column and the second sensing electrode column are disposed adjacent to each other in a second direction crossing the first direction;
a first one of the first sensing electrodes corresponds to the second sensing electrodes;
the second sensing electrodes corresponding to the first one of the first sensing electrodes, respectively, are electrically connected to the second sensing electrodes corresponding to a second one of the first sensing electrodes adjacent to the first one of the first sensing electrodes; and
the conductive pattern disposed on the first sensing electrode and the conductive pattern disposed on the second sensing electrode are spaced apart from each other.

10. The input sensing unit of claim 1, wherein:
the sensing electrode comprises a plurality of conductive fine lines forming a mesh shape; and
the conductive pattern is disposed on a mesh hole formed by the conductive fine lines intersecting each other.

11. The input sensing unit of claim 10, wherein the conductive pattern has a mesh shape.

12. The input sensing unit of claim 1, wherein:
the sensing electrode comprises a plurality of conductive fine lines forming a mesh shape;
the conductive patterns are disposed on one sensing electrode; and
the conductive patterns are spaced apart from each other with the conductive fine line interposed therebetween in a plan view.

13. The input sensing unit of claim 1, wherein:
the sensing electrodes and the conductive layer comprise a conductive polymer; and
the insulating member comprises an insulating polymer.

14. A display device comprising:
a substrate;
a display unit disposed on the substrate; and
an input sensing unit disposed on the display unit,
wherein:
the input sensing unit comprises:
a plurality of capacitive sensing electrodes connected to a pad unit through connecting lines;
a conductive layer disposed on at least a portion of the sensing electrodes; and
an insulating member disposed between the conductive layer and the sensing electrodes;
the conductive layer is disposed to overlap at least a portion of the sensing electrodes;
the conductive layer comprises a plurality of conductive patterns spaced apart from each other;
the conductive patterns disposed on different sensing electrodes are spaced apart from each other;
the conductive patterns are not connected to any of the connecting lines; and
wherein a distance between the conductive patterns is greater than a distance between the sensing electrodes.

15. The display device of claim 14, wherein:
the display unit comprises a plurality of pixel units;
the sensing electrode comprises a plurality of conductive fine lines forming a mesh shape; and
each of the pixel units is disposed in a mesh hole formed by the conductive fine lines intersecting each other.

16. The display device of claim 15, wherein:
a plurality of conductive patterns are disposed to be spaced apart from each other; and
the conductive patterns and the pixel units correspond to each other, respectively.

17. The display device of claim 15, wherein:
each of the pixel units comprises:
a first electrode;
a second electrode disposed on the first electrode; and
an emission layer disposed between the first electrode and the second electrode; and
at least one encapsulation layer is disposed between the second electrode and the sensing electrode.

18. The display device of claim 17, wherein:
the input sensing unit is disposed directly on the encapsulation layer; and
at least one insulating layer is disposed between the sensing electrode and the encapsulation layer.

19. The display device of claim 17, wherein:
the encapsulation layer comprises a multilayer; and
at least one layer of the multilayered encapsulation layer comprises an inorganic material.

\* \* \* \* \*